United States Patent
Ishii

(10) Patent No.: US 7,666,079 B2
(45) Date of Patent: Feb. 23, 2010

(54) VIDEO GAME PROCESSING APPARATUS, A METHOD AND A COMPUTER READABLE MEDIUM THAT STORES A PROGRAM FOR PROCESSING A VIDEO GAME

(75) Inventor: Koichi Ishii, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 150 days.

(21) Appl. No.: 11/678,890

(22) Filed: Feb. 26, 2007

(65) Prior Publication Data
US 2007/0202936 A1    Aug. 30, 2007

(30) Foreign Application Priority Data
Feb. 27, 2006    (JP) .............................. 2006-050042

(51) Int. Cl.
*A63F 13/10*    (2006.01)

(52) U.S. Cl. .............................. 463/8; 463/7; 273/317.1

(58) Field of Classification Search ................ 463/1–5, 463/7–8, 23, 42–43, 30–34, 36–39, 49–57; 345/566, 419, 156, 1.1–3.4, 539, 543–544; 273/148 R, 148 B, 309, 317.1, 340, 348, 273/361–367; 348/115, 117, 211.14; 717/168–178; 434/37, 240; 375/240.15, 240.25; *A63F 13/10*
See application file for complete search history.

(56) References Cited

U.S. PATENT DOCUMENTS 5,880,709 A * 3/1999 Itai et al. .................... 345/629
6,162,120 A * 12/2000 Takahashi et al. ............... 463/8
6,210,273 B1 * 4/2001 Matsuno ........................ 463/8
6,267,674 B1 * 7/2001 Kondo et al. .................. 463/32
6,270,416 B1 * 8/2001 Komoto ....................... 463/43

(Continued)

FOREIGN PATENT DOCUMENTS

JP    2002-166045    6/2002

(Continued)

OTHER PUBLICATIONS

Final Fantasy X-2, Nov. 18, 2003, Square Enix U.S.A., Inc., see full document.*

(Continued)

*Primary Examiner*—Peter DungBa Vo
*Assistant Examiner*—Arthur O. Hall
(74) *Attorney, Agent, or Firm*—Greenblum & Bernstein PLC

(57) ABSTRACT

Specification of an attack for a player character is received by means of an attack specifying operation of the player. A direct attack reaction is determined in the case where it is determined that the attack hits an enemy character A. The direct attack reaction indicates a reaction of the direct attack target character that suffers the direct attack. The enemy character A is then caused to execute the determined direct attack reaction. In the case where it is determined that an indirect attack to be caused by contact between the enemy characters A, B hits an enemy character B when the enemy character A executes the direct attack reaction, an indirect attack reaction indicating a reaction of the enemy character B that suffers the indirect attack is determined. The enemy character B is then caused to execute the determined indirect attack reaction.

9 Claims, 10 Drawing Sheets

「BLOW OFF」 (Reaction when hitting other enemy character)

「BLOW OFF」 (Reaction when hitting wall)

U.S. PATENT DOCUMENTS

| | | | |
|---|---|---|---|
| 6,273,818 B1 * | 8/2001 | Komoto | 463/31 |
| 6,283,861 B1 * | 9/2001 | Kawai et al. | 463/43 |
| 6,319,121 B1 * | 11/2001 | Yamada et al. | 463/8 |
| 6,409,604 B1 * | 6/2002 | Matsuno | 463/43 |
| 6,454,653 B1 * | 9/2002 | Kawazu | 463/43 |
| 6,585,599 B1 * | 7/2003 | Horigami et al. | 463/43 |
| 6,755,743 B1 * | 6/2004 | Yamashita et al. | 463/42 |
| 6,923,717 B2 * | 8/2005 | Mayer et al. | 463/4 |
| 7,033,275 B1 * | 4/2006 | Endo et al. | 463/33 |
| 7,170,508 B2 * | 1/2007 | Ohno et al. | 345/419 |
| 7,281,981 B2 * | 10/2007 | Yotoriyama | 463/32 |
| 7,281,982 B2 * | 10/2007 | Aonuma | 463/32 |
| 7,374,480 B2 * | 5/2008 | Otani et al. | 463/8 |
| 7,435,170 B2 * | 10/2008 | Karashima et al. | 463/8 |
| 7,532,211 B2 * | 5/2009 | Haga et al. | 345/419 |
| 2002/0019257 A1 * | 2/2002 | Koizumi et al. | 463/32 |
| 2005/0014543 A1 * | 1/2005 | Itoi et al. | 463/8 |
| 2007/0026944 A1 | 2/2007 | Maehiro et al. | |
| 2007/0060342 A1 * | 3/2007 | Sakaguchi et al. | 463/31 |
| 2007/0060347 A1 | 3/2007 | Itou | |
| 2007/0066392 A1 | 3/2007 | Itou | |

FOREIGN PATENT DOCUMENTS

| | | |
|---|---|---|
| JP | 2003-181137 | 7/2003 |

OTHER PUBLICATIONS

Devil May Cry, Oct. 17, 2001, Capcom Entertainment, Inc., see full document.*

Street Fighter Alpha 2, Oct. 1, 1996, Capcom Entertainment, Inc.*

AMG Data Solutions, Battle Pinball, Feb. 24, 1995, Banpresto, AMG Game ID H29742, http://www.allgame.com/game.php?id=29742&tab=screen.*

Icon Games, Virtual Marbles, Jun. 15, 2006, Icon Games, June Update, http://web.archive.org/web/20060811143858/http://www.icongames.com.br/marbles.htm.*

U.S. Appl. No. 11/680,205, filed Feb. 28, 2007.

U.S. Appl. No. 11/674,297, filed Feb. 12, 2007.

English language Abstract of JP 2003-181137.

"Devil May Cry 2", Dengeki PlayStation, vol. 8, No. 20, pp. 182-187, Sep. 13, 2002, MediaWorks.

Fami-Tsu Xbox vol. 3, No. 9 (Grand Sept. Auto. Double-pack), Kabushiki Kaisha Enter-Brain, Sep. 1, 2004, p. 35.

"Konami Kanpeki Koryaku Series (80) Metal-Gear Solid 2, Sans of Liberty Formal Complete Guide-Expert File First Edition", Konami Kabushiki Kaisha, Mar. 5, 2002, p. 103, ISBN: 4-575-16307-4.

English Language abstract of JP 2002-166045.

* cited by examiner

FIG. 3

| WEAPON | POSITIONAL RELATIONSHIP | GROUND LEVEL | WEIGHT OF ATTACK TARGET | PC REACTION | DIRECT ATTACK REACTION |
|---|---|---|---|---|---|
| SWORD | ADJACENT TO FACE | FLOOR, GRASS | LESS THAN 50 | NON | BLOW OFF BY PREDETERMINED DISTANCE (SHORT) |
| SWORD | ADJACENT TO FACE | FLOOR, GRASS | 50 OR MORE | NON | BLOW OFF BY PREDETERMINED DISTANCE (LONG) |
| SWORD | ADJACENT TO FACE | ICE | LESS THAN 50 | NON | BLOW OFF BY PREDETERMINED DISTANCE (SHORT) AND SLIP |
| SWORD | ADJACENT TO FACE | ICE | 50 OR MORE | NON | BLOW OFF BY PREDETERMINED DISTANCE (LONG) AND SLIP |
| FLAIL | PREDETERMINED RANGE OF FRONT | …… | …… | NON | FLICK OFF |
| FLAIL | PREDETERMINED RANGE OF FRONT | …… | …… | NON | FLICK OFF |
| HAMMER | PREDETERMINED RANGE OF FACE | FLOOR, GRASS | …… | NON | SLIP (SHORT) |
| HAMMER | PREDETERMINED RANGE OF FACE | ICE | …… | NON | SLIP (LONG) |
| MIGHT | ADJACENT TO CIRCUMFERENCE | …… | LESS THAN 50 | NON | JUMP HIGH |
| MIGHT | ADJACENT TO CIRCUMFERENCE | …… | 50 OR MORE | NON | JUMP LOW |
| BOW | PREDETERMINED RANGE OF FACE | FLOOR, GRASS | LESS THAN 50 | NON | KNOCK BACK |
| BOW | PREDETERMINED RANGE OF FACE | FLOOR, GRASS | 50 OR MORE | NON | SKEWER (NOT PENETRATION) |
| BOW | PREDETERMINED RANGE OF FACE | ICE | 50 OR MORE | SLIP BACKWARD | SKEWER (PENETRATION) |

FIG. 4

| REACTION NAME | REACTION WHEN HITTING OTHER ENEMY CHARACTER | REACTION WHEN HITTING WALL |
|---|---|---|
| BLOW OFF | Reaction of direct reaction character is terminated.<br>Other enemy character is further blown off. | Direct enemy character is stopped. |
| FLICK OFF | Reaction of direct reaction character is not terminated.<br>Other enemy character is flicked off. | Direct reaction character is bounced back. |
| SLIP | Reaction of direct reaction character is not terminated.<br>Other enemy character is slipped. | Direct reaction character is bounced back. |
| JUMP | Direct reaction character does not hit other enemy character. | Direct reaction character does not hit wall. |
| KNOCK BACK | Direct reaction character does not hit other enemy character. | Direct enemy character is stopped. |
| SKEWER | Direct reaction character and other enemy characters are slipped all together in case of three or less characters.<br>Any other enemy character is blow off by three characters in case of four or more characters. | Direct reaction character and other enemy characters are bounced back apart. |

「BLOW OFF」

「BLOW OFF」 (Reaction when hitting other enemy character)

「BLOW OFF」 (Reaction when hitting wall)

「FLICK OFF」

「FLICK OFF」(Reaction when hitting other enemy character)

「FLICK OFF」(Reaction when hitting wall)

「SLIP」

「SLIP」(Reaction when hitting other enemy character)

「SLIP」(Reaction when hitting wall)

「SKEWER」

「SKEWER」(Reaction when hitting other enemy character)

「SKEWER」(Reaction when hitting wall)

VIDEO GAME PROCESSING APPARATUS, A METHOD AND A COMPUTER READABLE MEDIUM THAT STORES A PROGRAM FOR PROCESSING A VIDEO GAME

CROSS-REFERENCE TO RELATED APPLICATION

The present disclosure relates to subject matter contained in Japanese Patent Application No.2006-050042, filed on Feb. 27, 2006, the disclosure of which is expressly incorporated herein by reference in its entirety.

BACKGROUND OF THE INVENTION

1. Field of the Invention

The present invention relates to a technique for controlling progress of a video game by displaying a player character on an image display screen of an image display apparatus, and by controlling an action of the player character displayed on the image display screen in response to operation(s) by a player.

2. Description of the Related Art

Heretofore, various kinds of so-called role playing games (RPG; that is, a game in which a player plays a role of a character in a world of the game, and accomplishes a predetermined object while enjoying a process that the character grows through various experiences) have been provided.

In a RPG, generally, a player character acting in response to operations by the player wins a battle against an enemy character thwarting accomplishment of a predetermined object in the RPG, by which various benefits such as an experiential value are supplied to the player character.

In a video game such as a RPG, an attack against an enemy character in a battle is generally executed by means of a direct attack in which a weapon such as a sword is used or an indirect attack in which magic is used.

In such an attack, heretofore, there is proposed a system in which it is determined whether or not an attack against an enemy character can be executed in view of movement speed of the player character and/or a distance between the player character and the enemy character.

In the conventional video game, a direct attack and an indirect attack can be executed by the player character. However, the direct or indirect attack is an attack to the inside of a predetermined range. More specifically, in the case where the attack is a direct attack with a sword, an enemy character positioned within a range in which the sword reaches to the enemy character may become an attack target. In the case where the attack is an indirect attack with magic, an enemy character positioned within a predetermined range of a distance from the player character may become an attack target. Thus, such an attack became monotone, and therefore, there was a fear that this causes such a player to lose interest in the video game.

SUMMARY OF THE INVENTION

It is one object of the present invention to solve the problems described above and to provide a video game processing apparatus, a method and a computer program product for processing a video game by which variations in an attack during a battle can be increased in a video game and player's interest can be improved in the video game.

In order to achieve the above object, an aspect of the present invention is directed to a video game processing apparatus. The video game processing apparatus (for example, a video game apparatus main body 10, a video game apparatus 100) causes an image display apparatus to display a player character of a video game on an image display screen of the image display apparatus. The video game processing apparatus controls progress of the video game by controlling an action of the player character to be displayed on the image display screen in accordance with operations by a player. The video game processing apparatus of the present invention includes an attack specifying receiver that receives specification of an attack for the player character by means of an attack specifying operation of the player.

The video game processing apparatus also includes a direct attack hit determiner that determines whether the attack from the player character hits an attack target character or not when the attack specifying receiver receives the attack specification.

The video game processing apparatus also includes a direct attack reaction determiner that determines a direct attack reaction in the case where the direct attack hit determiner determines that the attack hits the attack target character. In this case, the direct attack reaction indicates a reaction of the direct attack target character that suffers the direct attack.

The video game processing apparatus also includes a direct attack reaction executor that causes the direct attack target character to execute the direct attack reaction determined by the direct attack reaction determiner.

The video game processing apparatus also includes an indirect attack hit determiner that determines whether or not an indirect attack hits an attack target character other than the direct attack target character when the direct attack target character executes the direct attack reaction by means of the direct attack reaction executer. In this case, the indirect attack is caused by contact between the direct attack target character and the other attack target character.

The video game processing apparatus also includes an indirect attack reaction determiner that determines an indirect attack reaction in the case where the indirect attack hit determiner determines that the indirect attack hits the other attack target character. In this case, the indirect attack reaction indicates a reaction of the other attack target character that suffers the indirect attack.

The video game processing apparatus also includes an indirect attack reaction executor that causes the other attack target character to execute the indirect attack reaction determined by the indirect attack reaction determiner.

Since the video game processing apparatus may have a configuration as described above, it is possible to increase variations in an attack during a battle in the video game. Thus, this makes it possible to improve player's interest in the video game.

It is preferable that the direct attack reaction determiner determines the direct attack reaction on the basis of direct reaction determining information including attack contents of the player character. Since the video game processing apparatus may have a configuration as described above, it is possible to change the direct attack reaction in accordance with the attack contents of the player character. This makes it possible to increase variations in an attack during a battle in the video game.

It is preferable that the direct attack reaction determiner determines the direct attack reaction on the basis of direct reaction determining information including the kind of ground level in a battle field in which a battle is executed. Since the video game processing apparatus may have a configuration as described above, it is possible to change the direct attack reaction in accordance with the type of ground level. This makes it possible to increase variations in an attack during a battle in the video game.

It is preferable that the direct attack reaction determiner determines the direct attack reaction on the basis of direct reaction determining information including a weight value that is determined in advance as weight of the direct attack target character. Since the video game processing apparatus may have a configuration as described above, it is possible to change the direct attack reaction in accordance with the weight value of the direct attack target character. This makes it possible to increase variations in an attack during a battle in the video game.

It is preferable that the attack target character is at least one of an enemy character and an item. Since the video game processing apparatus may have a configuration as described above, it is possible to increase variations in an attack against the enemy character or the item that can be obtained or taken out as a result of destruction or the like.

It is preferable that the direct attack reaction determiner determines the direct attack reaction by selecting one direct attack reaction from multiple kinds of direct attack reactions including a first reaction, a second reaction, a third reaction and a fourth reaction. In this case, the direct attack target character is blown off in the first reaction. The direct attack target character is flicked off in the second reaction. The direct attack target character is slipped in the third reaction. The direct attack target character is jumped in the fourth reaction.

It is preferable that the indirect attack reaction determiner determines the indirect attack reaction in accordance with the kind of direct attack reaction of the direct attack target character that is brought into contact with the other attack target character. Since the video game processing apparatus may have a configuration as described above, it is possible to determine the indirect attack reaction that can be changed in accordance with the kind of the direct attack reaction of the direct attack target character. This makes it possible to increase variations in an attack during a battle in the video game.

Further, according to another aspect of the present invention, the present invention is directed to a method of processing a video game by causing an image display apparatus to display a player character of the video game on an image screen of the image display apparatus. In this case, the method controls progress of the video game by controlling an action of the player character to be displayed on the image screen in accordance with an operation by a player. The method of the present invention includes receiving specification of an attack for the player character by means of an attack specifying operation of the player.

The method also includes determining whether the attack from the player character hits an attack target character or not when the attack specification is received.

The method also includes determining a direct attack reaction in the case where it is determined that the attack hits the attack target character. In this case, the direct attack reaction indicates a reaction of the direct attack target character that suffers the direct attack.

The method also includes causing the direct attack target character to execute the determined direct attack reaction.

The method also includes determining whether or not an indirect attack hits an attack target character other than the direct attack target character when the direct attack target character executes the direct attack reaction. In this case, the indirect attack is caused by contact between the direct attack target character and the other attack target character.

The method also includes determining an indirect attack reaction in the case where it is determined that the indirect attack hits the other attack target character. In this case, the indirect attack reaction indicates a reaction of the other attack target character that suffers the indirect attack.

The method also includes causing the other attack target character to execute the determined indirect attack reaction.

Moreover, according to still another aspect of the present invention, the present invention is directed to a computer program product for processing a video game. In this case, progress of the video game is controlled by causing an image display apparatus to display a player character of the video game on an image screen of the image display apparatus, and controlling an action of the player character to be displayed on the image screen in accordance with an operation by a player. The computer program product of the present invention causes a computer (for example, the video game apparatus 100, including the video game apparatus main body 10) to execute steps including receiving specification of an attack for the player character by means of an attack specifying operation of the player.

The steps also include determining whether the attack from the player character hits an attack target character or not when the attack specification is received.

The steps also include determining a direct attack reaction in the case where it is determined that the attack hits the attack target character. In this case, the direct attack reaction indicates a reaction of the direct attack target character that suffers the direct attack.

The steps also include causing the direct attack target character to execute the determined direct attack reaction.

The steps also include determining whether or not an indirect attack hits an attack target character other than the direct attack target character when the direct attack target character executes the direct attack reaction. In this case, the indirect attack is caused by contact between the direct attack target character and the other attack target character.

The steps also include determining an indirect attack reaction in the case where it is determined that the indirect attack hits the other attack target character. In this case, the indirect attack reaction indicates a reaction of the other attack target character that suffers the indirect attack.

The steps also include causing the other attack target character to execute the determined indirect attack reaction.

According to the present invention, it is possible to increase variations of an attack during a battle in a video game, and this makes it possible to improve player's interest in the video game.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

FIG. 3 is an explanatory drawing that shows an example of a table for determining a direct attack reaction.

FIG. 4 is an explanatory drawing that shows a reaction when an enemy character executing a direct attack reaction hits other enemy character and a reaction when the enemy character hits a wall.

DETAILED DESCRIPTION OF THE INVENTION

Preferred embodiments of a video game processing apparatus, a method and a computer program product for processing a video game according to the present invention will now be described in detail with reference to the appending drawings.

Figure 1:
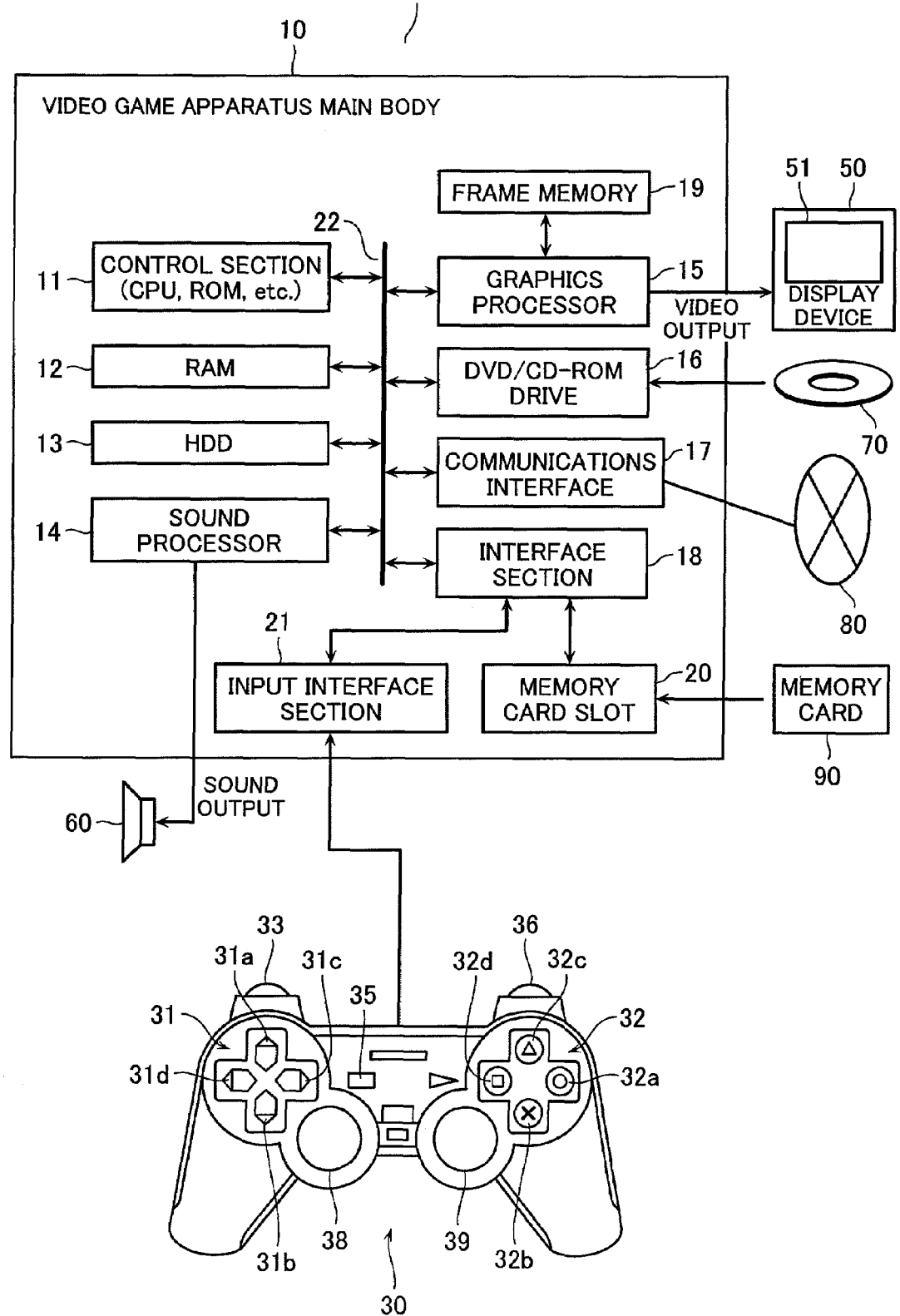
FIG. 1 is a block diagram that illustrates an example of a configuration of a video game apparatus to which an embodiment of the present invention is applied.

FIG. 1 is a block diagram that illustrates a configuration of a video game apparatus 100 to which an embodiment of the present invention is applied. However, those skilled in the art will readily recognize that other devices may be used without departing from the spirit or scope of the present invention.

As shown in FIG. 1, a video game apparatus 100 of the present embodiment includes a video game apparatus main body 10, a display device 50, and a sound output device 60. The video game apparatus main body 10 is constituted from a video game system that is put on the market, for example. Further, the display device 50 is constituted from, for example, a television apparatus, a liquid crystal display device, a micro-mirror device, a holographic display device, or any combination thereof. The display device 50 is provided with an image display screen 51. However, those skilled in the art will readily recognize that any device capable of generating or reproducing an image may be used without departing from the scope or spirit of the present invention.

The video game apparatus main body 10 includes a control section 11, a RAM (Random Access Memory) 12, a HDD (hard disk drive) 13, a sound processor 14, a graphics processor 15, a DVD/CD-ROM drive 16, a communications interface 17, an interface section 18, a frame memory 19, a memory card slot 20, and an input interface section 21.

Each of the control section 11, the RAM (Random Access Memory) 12, the HDD (Hard Disk Drive) 13, the sound processor 14, the graphics processor 15, the DVD/CD-ROM drive 16, the communications interface 17 and the interface section 18 is connected to an internal bus 22.

The control section 11 includes a CPU (Central Processing Unit), ROM (Read Only Memory) and the like. The control section 11 executes control processes of the whole video game apparatus 100 in accordance with control programs stored in the HDD 13 and/or a storage medium 70. The control section 11 includes an internal timer used to generate a timer interruption. The RAM 12 is used as a work area for the control section 11. The HDD 13 is a storage area for storing the control programs and various data.

The sound processor 14 is connected to a sound output device 60, which includes a speaker, for example, but may include any other device capable of generating or reproducing an audible signal. The sound processor 14 outputs a sound signal to the sound output device 60 in accordance with a sound outputting command from the control section 11 that executes a process according to the control programs. In this regard, the sound output device 60 may be embedded in the display device 50 or the video game apparatus main body 10, or may be affixed to a vibrating surface that may be caused to generate the audible signal.

The graphics processor 15 is connected to the display device 50 including the image display screen 51 on which an image is displayed. However, those skilled in the art will readily recognize that the graphics processor may be coupled to other known types of display devices, such as a head-mounted display, a holographic three-dimensional display or the like, without departing from the spirit or scope of the present invention. The graphics processor 15 develops an image on the frame memory 19 in accordance with a drawing or graphics command from the control section 11, and outputs video signals for displaying the image on the image display screen 51 to the display device 50. A switching time for images to be displayed according to the video signals is set to 1/30 seconds per frame (for NTSC type displays), for example. However, the switching time may be any other frame rate (for example, 1/25 second per frame (for PAL type displays)) as those skilled in the art will appreciate without departing from the spirit or scope of the present invention.

A storage medium 70 such as a DVD-ROM medium or a CD-ROM medium, or equivalent, in which control programs for a video game are stored is mounted in the DVD/CD-ROM drive 16. The DVD/CD-ROM drive 16 executes a process for reading out various data such as control programs from the storage medium 70.

The communications interface 17 is connected to a communication network 80 such as the Internet, a local area network (LAN), a wide area network (WAN), or the like, in a wireless or wired manner. The video game apparatus main body 10 carries out communication with, for example, another computer via the communication network 80 using a communication function of the communications interface 17.

Each of the input interface section 21 and the memory card slot 20 is connected to the interface section 18. The interface section 18 causes instruction data from the input interface section 21 to be stored in the RAM 12 on the basis of operation(s) of a controller device such as a keypad 30 by a player of the video game apparatus 100. In response to the instruction data stored in the RAM 12, the control section 11 executes various arithmetic processing.

The video game apparatus main body 10 is connected to the controller device such as the keypad 30 as an operation input section (controller) via the input interface section 21. However, other types of controllers may be used without departing from the scope or spirit of the present invention.

As shown in FIG. 1, for example, a cross key 31, a group of buttons 32, a left joystick 38 and a right joystick 39 are arranged on the upper surface of the keypad 30. The cross key 31 includes an upper key 31a, a lower key 31b, a right key 31c and a left key 31d. The group of buttons 32 includes a circle button 32a, an X key 32b, a triangle key 32c and a square key 32d. Further, a select button 35 is arranged at a connecting portion between a base on which the cross key 31 is arranged and a base on which the group of buttons 32 are arranged. In addition, multiple buttons such as an R1 button 36 and an L1 button 33 are arranged at the side surface of the keypad 30.

The keypad 30 is provided with multiple switches respectively connected to the cross key 31, the circle button 32a, the X button 32b, the triangle button 32c, the square button 32d, the select button 35, the R1 button 36 and the L1 button 33. When pressing force is applied to any button, the corresponding switch is turned on. A detected signal in accordance with on/off of the switch is generated in the keypad 30, and detected signals are generated, respectively, corresponding to inclined directions of the left joystick 38 and the right joystick 39 in the keypad 30.

The two types of detected signals generated in the keypad 30 are outputted to the control section 11 via the input interface section 21 (through wired or wireless connection), by which detected information indicating that any button on the keypad 30 is pressed and detected information indicating the state of each of the left joystick 38 and the right joystick 39 are generated. In this way, operation instruction(s) by a user (player) using the keypad 30, for example, is supplied to the video game apparatus main body 10 (that is, the control section 11).

Further, the interface section 18 executes, according to the command(s) from the control section 11, a process to store data indicative of the progress of the video game stored in the RAM 12 into the memory card 90 installed in the memory card slot 20. The interface section 18 also executes processes to read out data on the video game stored in the memory card 90 at the time of suspending the video game and to transfer such data to the RAM 12, and the like.

Various data, such as control program data for performing the video game with the video game apparatus 100, are stored in the storage medium 70, for example. The various data, such as the control program data stored in the storage medium 70, are read out by the DVD/CD-ROM drive 16 in which the storage medium 70 is installed. The data thus read out are loaded onto the RAM 12. The control section 11 executes, in accordance with the control program loaded on the RAM 12, various processes such as a process to output the drawing or graphics command to the graphics processor 15, and a process to output the sound outputting command to the sound processor 14. In this regard, the interim data generated in response to the progress of the video game (for example, data indicative of scoring of the video game, the state of a player character and the like) are stored in the RAM 12 used as a work memory while the control section 11 executes processing.

It is assumed that a three-dimensional video game according to an aspect of the present embodiment is a video game wherein multiple characters, including a player character (that is, a character that moves in accordance with the operation of the keypad 30 by the player), move on a field provided in a virtual three-dimensional space, by which the video game proceeds. In this regard, it is assumed that the virtual three-dimensional space in which the field is formed is indicated by coordinates of the world coordinate system. The field is defined by multiple surfaces, and coordinates of vertexes of the respective constituent surfaces are shown as characteristic points.

Next, an operation of the video game apparatus 100 according to an aspect of the present embodiment will now be described.

Here, in order to simplify the explanation of the operation of the video game apparatus 100, it is assumed that only a single player character and multiple non-player characters (which are moved in accordance with control processes of the video game apparatus 100 (more specifically, control processes of the control section 11), and hereinafter, referred to simply as "NPC") exist as objects that are movable in the virtual three-dimensional space. However, the explanations for any process other than the processes relating to the present invention are omitted, in particular. In this regard, in the present embodiment, video game control for a RPG is executed, but those skilled in the art will recognize and appreciate that changes to the present invention can be made without departing from the scope or spirit of the present invention.

Figure 2:
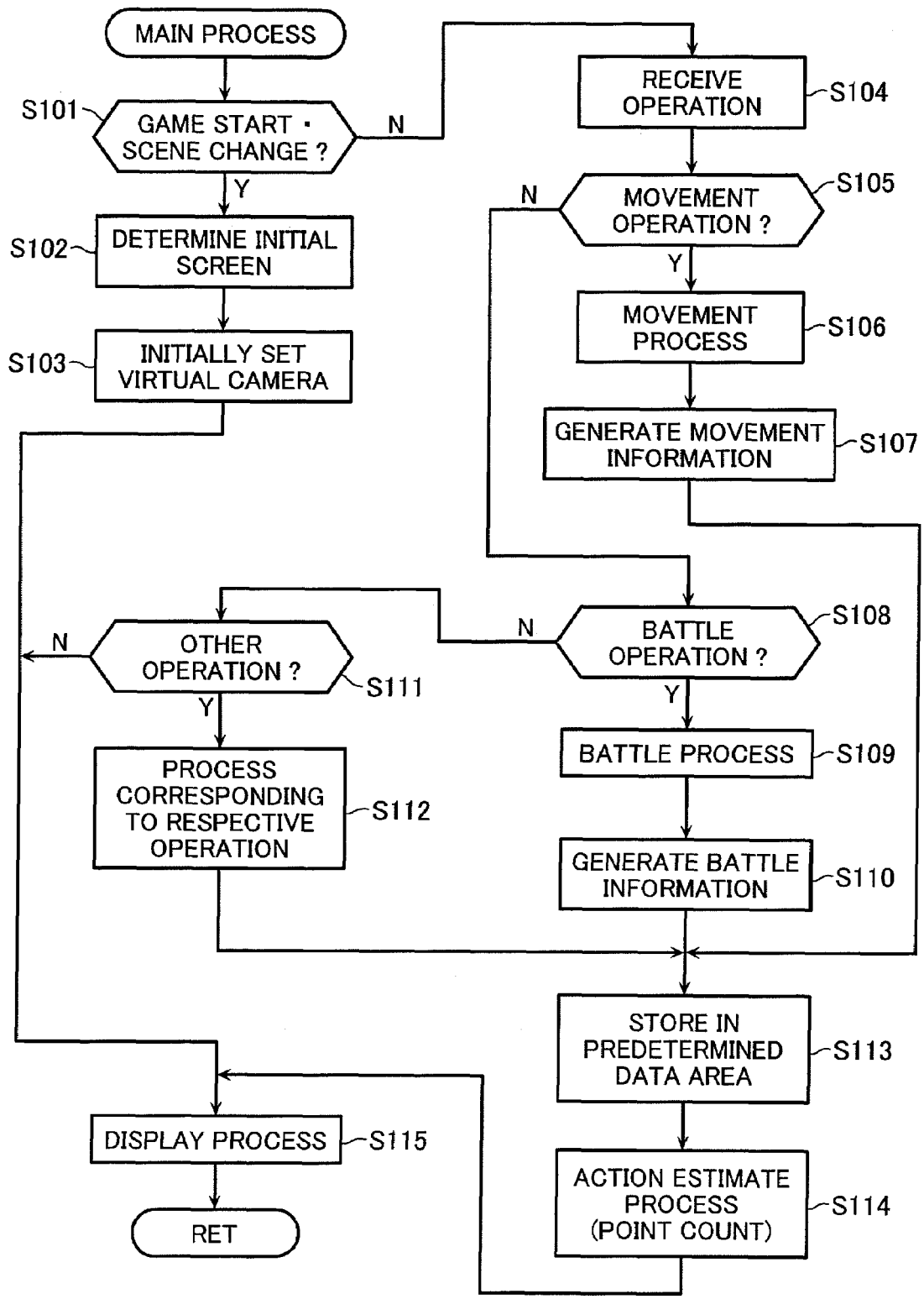
FIG. 2 is a flowchart that illustrates an example of a main process.
Figure 5A:
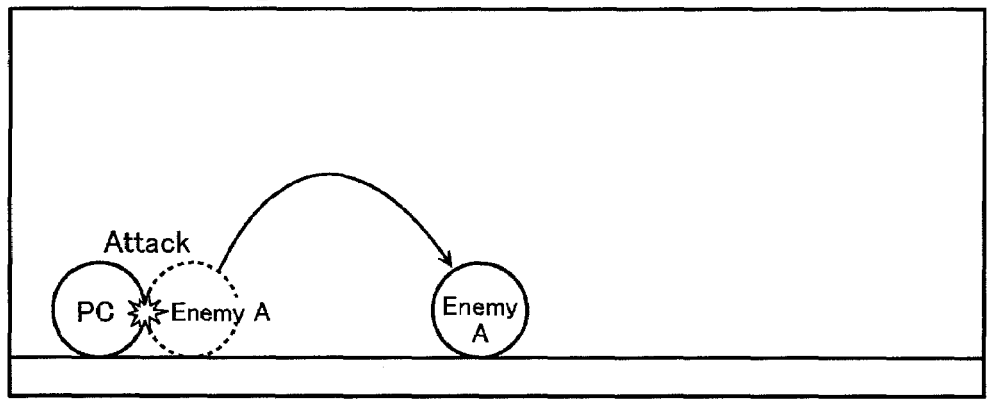
FIG. 5 is an explanatory drawing that shows contents of a direct attack reaction "blow off".
Figure 5B:
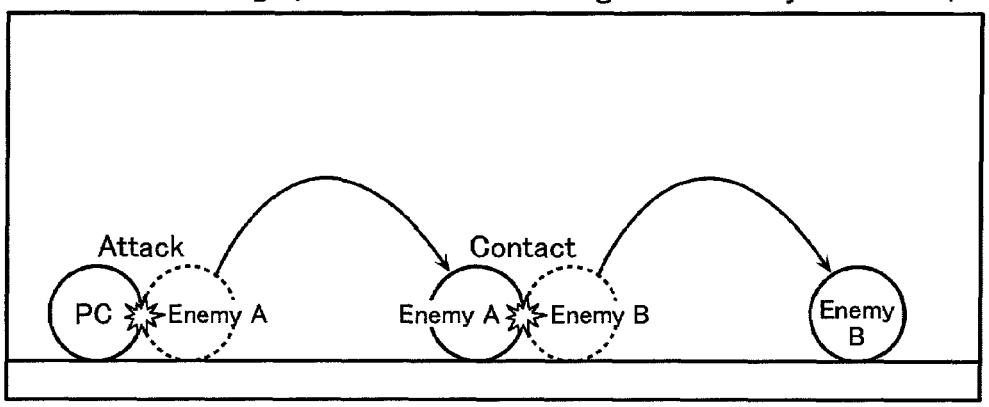
Figure 5C:
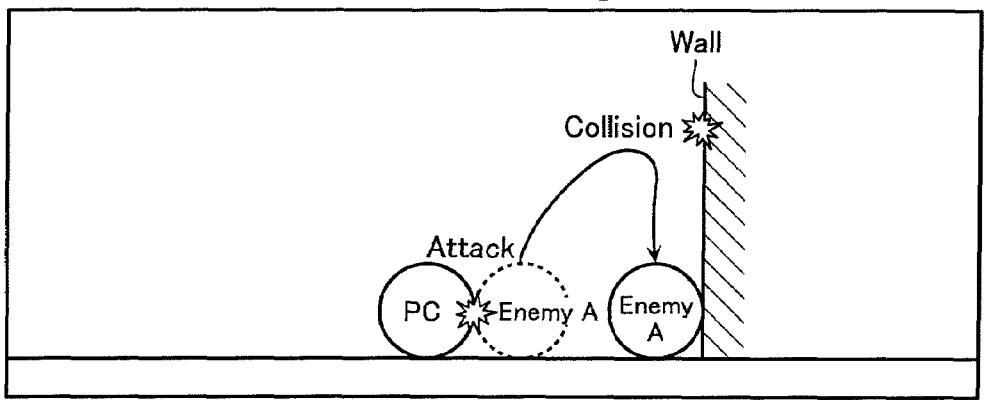
Figure 6A:
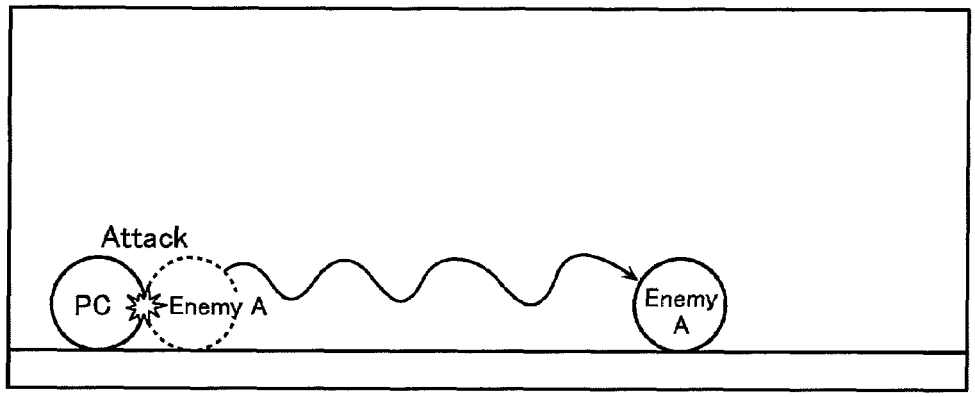
FIG. 6 is an explanatory drawing that shows contents of a direct attack reaction "flick off".
Figure 6B:
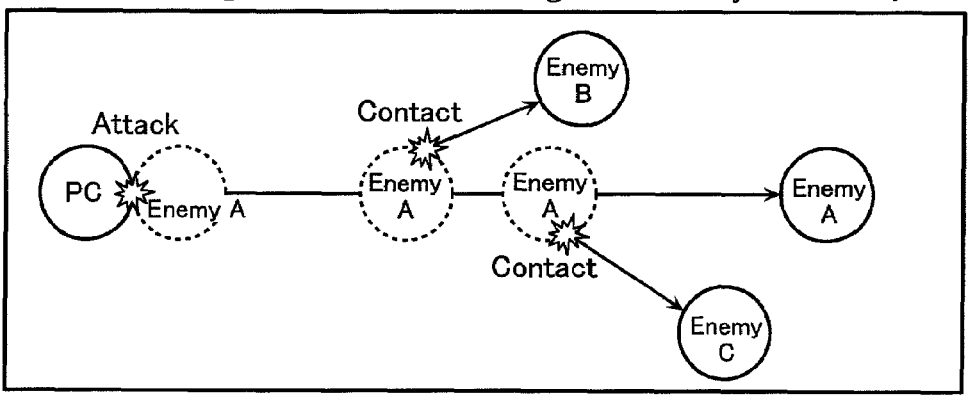
Figure 6C:
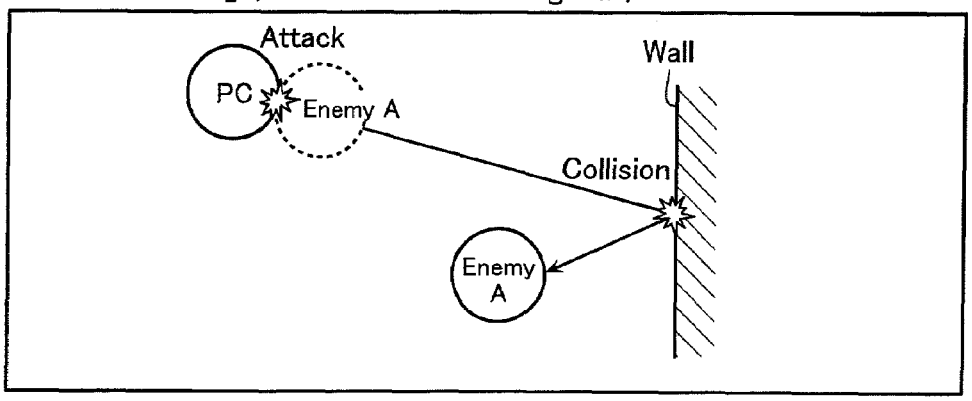
Figure 7A:
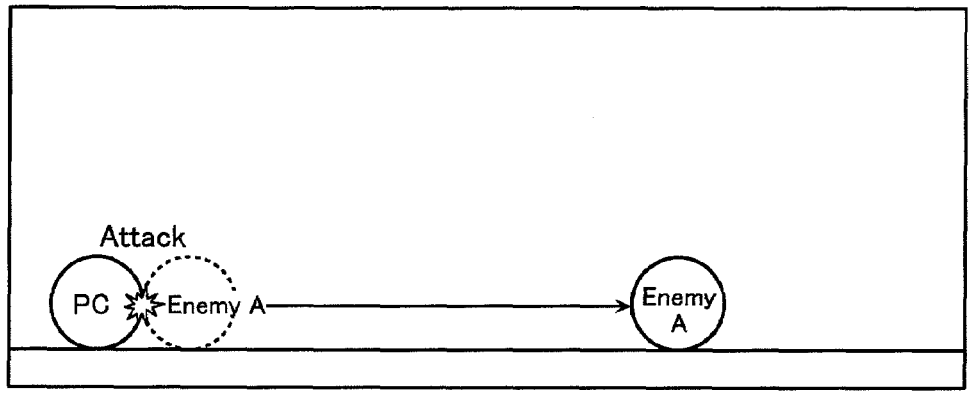
FIG. 7 is an explanatory drawing that shows contents of a direct attack reaction "slip".
Figure 7B:
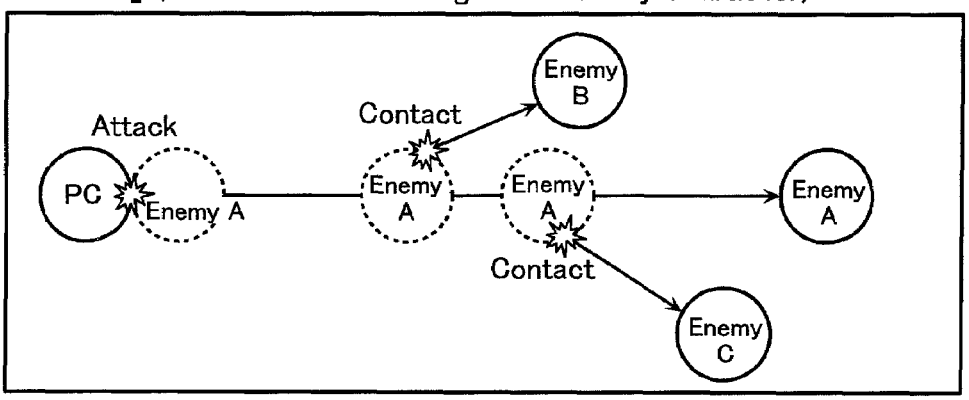
Figure 7C:
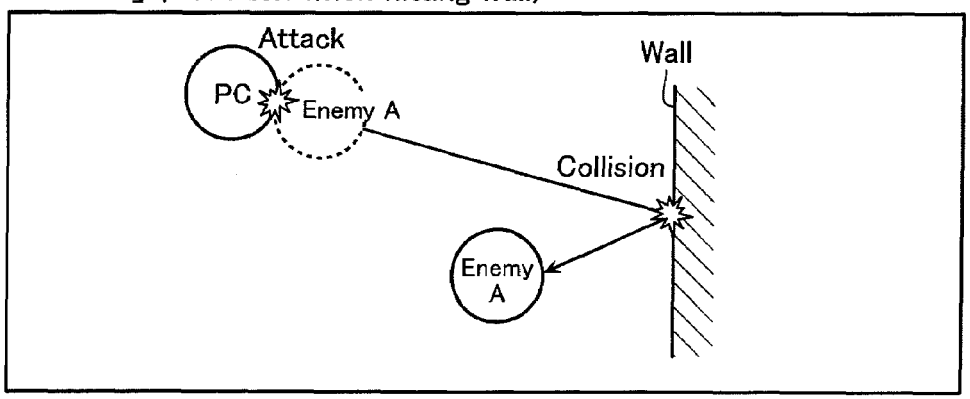

FIG. 2 is a flowchart that illustrates an example of a main process of the video game apparatus 100 according to the present embodiment. The main process is a process for generating an image for one frame and a process required for the control of the video game. The process is executed in accordance with a timer interruption at every $\frac{1}{30}$ second. However, it is to be noted that timing of "at every $\frac{1}{30}$ second" is only one example, as mentioned above. Instead, for example, the main process may be executed in accordance with a timer interruption at every single field period (every $\frac{1}{60}$ second) or at every two frame periods (every $\frac{1}{15}$ second), or any other appropriate field rate that may be recognized by those skilled in the art to be appropriate without departing from the scope or spirit of the present invention.

In the present embodiment, a video game (that is, a RPG game) proceeds in a common field (that is, a single field where a battle field and a movement field are not distinguished from each other) in which various actions (such as a battle action and/or a movement action), including the movement of the player character and a battle by the player character, are allowed. In the case where a predetermined object in the field is accomplished, one stage may be terminated and the processing may proceed to another stage executed in a next field. Further, in the present embodiment, a same time base is applied to the respective characters existing in such a field. Once a NPC enters the stage in the field, the NPC moves on the field or stands still on the field in accordance with the same time base until a hit point (which is a value indicating life force, and hereinafter, referred to simply as "HP") thereof becomes zero. In this case, a portion displayed on the image display screen 51 as a character image is a portion that exists within the field of view of a virtual camera in the field.

In the main process, the control section 11 determines whether an instruction to start a video game is generated through an operation of the keypad 30, via manipulation of the controller 30 by the player or not in the case where the state is still before the video game start. Alternatively, once the video game has started or is in progress, the control section 11 determines whether a timing state is reached to change the scene (for example, change the field) or not in the case where the state is during execution of the video game (Step S101). The timing state to change the scene is, for example, the time at which a virtual three-dimensional space illustrating a new scene is displayed on the image display screen 51 in order to finish the scene that has been displayed on the image display screen 51 until that point (for example, a scene displayed by means of a virtual three-dimensional space, and a scene displayed by means of a directorial moving image) and to switch the displayed scene to the new scene.

In the case where it is determined that an instruction to start a video game is generated or that the timing state reaches a state to change the scene ("Yes" at Step S101), the control section 11 determines an initial screen (an initial screen shown at the time of a start of the video game, or an initial screen shown at the time of a change in the scene) in accordance with the control program (Step S102). In this case, various data, such as image data used for the video game and characters, are stored in the storage medium 70. At Step S102, an initial display position of the player character in an initial screen or a scene after a scene change (for example, a new stage in the RPG), a non-player character or non-player characters to be displayed, an initial display position of each of the non-player characters (NPCs) to be displayed and the like are determined in accordance with the control program.

Subsequently, the control section 11 determines a viewpoint position of a virtual camera, a direction of a visual axis, and a size of a visual angle in accordance with the control program. The control section 11 then executes an initial setup for the virtual camera to execute a perspective transformation (Step S103). Then, the processing flow proceeds to Step S115.

On the other hand, in the case where it is determined that the video game is executed, and it is not time to change the scene ("No" at Step S101), the control section 11 receives instruction data in accordance with the operation of the keypad 30 by the player (Step S104). Namely, the control section 11 determines whether or not instruction data for executing movement of the player character or the like are inputted from the keypad 30 via the input interface section 21. In the case where effective instruction data (that is, it means that such effective instruction data are instruction data that is allowed to be received by the control section 11) are inputted, the control section 11 receives the effective instruction data.

In the case where the control section 11 receives instruction data for instructing an action of the player character relating to the movement of the player character (that is, movement instruction data: a movement instruction by a movement command or the cross key (directional instruction key)) in accordance with the operation of the keypad 30 relating to the movement of the player character (movement operation) at Step S104 ("Yes" at Step S105), the control section 11 executes a movement process in accordance with the movement instruction data thus received (Step S106). In the movement process, the control section 11 causes the position of the player character to be moved in a virtual space (on the present field) in accordance with the received movement instruction data. In this regard, such a movement command may include a dash instruction command, for example. The dash instruction command is a command to move the player character quickly, and a command for supplying an instruction that the player character goes away (or runs away) from a battle area quickly if the player character is in a melee, for example.

Subsequently, the control section 11 generates movement information on the basis of the position information of the player character derived along with the movement process (Step S107). Namely, in accordance with the movement of the position of the player character by means of the movement process, the control section 11 updates necessary data among data on the viewpoint position of the virtual camera, data on the direction of a visual axis, data on the size of a visual angle, and the like. The control section 11 then changes the setting content of the virtual camera. The movement information includes various kinds of information on the movement such as the position of the player character after the movement, the viewpoint position of the virtual camera, the direction of the visual axis, and the size of the visual angle changed along with the movement of the player character as well as the information on the movement of the player character. Then, the processing flow proceeds to Step S113.

In the case where the control section 11 receives instruction data for instructing an action for the player character relating to a battle (that is, battle instruction data: a battle command) in accordance with the operation of the keypad 30 by the player for instructing the action of the player character relating to a battle (a battle operation) at Step S104 ("Yes" at Step S108), the control section 11 executes a battle process in accordance with the received battle instruction data (Step S109). In the battle process, the control section 11 executes, for example, a process to determine a battle result and/or battle development between an enemy character (that is, a non-player character to battle against) and the player character, and the like.

Subsequently, the control section 11 generates battle information on the basis of the battle result and/or battle development determined by means of the battle process (Step S110). Namely, in accordance with the battle result and/or battle development by the battle process, the control section 11 updates and sets necessary information. The set information may include, for example, the name of the player character that battles an enemy character in the battle process, the name of the enemy character, battle development information, battle result information, a parameter (or parameters) that defines the ability (or abilities) of the player character, and the like. The battle information includes various kinds of information on the battle, such as the name of the player character that battles the enemy character, the name of the enemy character, battle development, battle result thereof, and a parameter that defines the ability of the player character. Then, the processing flow proceeds to Step S113.

In the case where the control section 11 receives instruction data for other instructions (that is, other instruction data: another command) in accordance with the operation of the keypad 30 for executing other instruction (other operation) at Step S104 ("No" at Step S105, "No" at Step S108, and "Yes" at Step S111), the control section 11 executes a process (for example, a conversation between characters, a purchase action, a pick up action, and the like) in accordance with the other instruction data thus received (Step S112). The other information corresponding to the process result at Step S112 is then generated, and the processing flow proceeds to Step S113.

The control section 11 updates the current position of the player character by storing the movement information generated at Step S107 in a predetermined data area of the RAM 12 at Step S113. Further, the control section 11 memorizes and stores various action histories of the player character by storing the battle information generated at Step S110 and the other information generated after Step S112 in a predetermined data area of the RAM 12 at Step S113.

Subsequently, the control section 11 executes an action estimate process on the basis of the information indicating the action histories of the player character once stored in the RAM 12 (Step S114). More specifically, information required to be digitized is digitized using conversion tables prepared in advance. Further, with respect to information required to be weighted, a score is calculated by multiplying predetermined numerical values and summing these multiplied numerical values. The calculated score is added to a previous score stored in a predetermined data area of the RAM 12, and the added score is again stored in the predetermined data area. In this way, the score is updated as estimate information.

Then, the control section 11 perspectively transforms the virtual three-dimensional space including the player character and the non-player characters to be displayed from the virtual camera onto the virtual screen in accordance with the setting contents of the virtual camera and the like. The control section 11 then executes a display process to generate a two-dimensional image to be displayed on the image display screen 51 (Step S115). When the display process is terminated, this main process is also terminated. Then, when a timer interruption is generated at the time of a start of a next frame period, a next main process is executed (that is, the main process is repeated). By repeatedly executing the main process, a character image is switched or shifted every frame period, and a moving image (animation) is resultantly displayed on the image display screen 51.

Now, the display process at Step S115 will be briefly described. At Step S115, the control section 11 first transforms at least the coordinates of the vertexes of respective polygons included within a range to be perspectively transformed on the virtual screen among the coordinates of the vertexes of polygons constituting the virtual three-dimensional space, in which the player character and the three-dimensional non-player characters are included, from the coordinates of the world coordinate system to the coordinates of the viewpoint coordinate system. Subsequently, the control section 11 transmits the coordinates of the vertexes of the polygons of the player character and the non-player characters in the viewpoint coordinate system to the graphics processor 15, thereby outputting a drawing or graphics command to the graphics processor 15.

When the drawing or graphics command is inputted to the graphics processor 15, the graphics processor 15 updates, on the basis of the coordinates of the viewpoint coordinate system, the content of the Z buffer so that data on the points that reside at the front side are retained with respect to each of points constituting respective surfaces. When the content of the Z buffer is updated, the graphics processor 15 develops image data on the points that reside at the front side on the frame memory 19. Moreover, the graphics processor 15 executes some processes such as a shading process and a texture mapping process with respect to the developed image data.

Then, the graphics processor 15 in turn reads out the image data developed on the frame memory 19, and generates video signals by adding a sync signal to the image data to output the video signals to the display device 50. The display device 50 displays an image corresponding to the video signals outputted from the graphics processor 15 on the image display screen 51. By switching images displayed on the image display screen 51 every single frame period, the player can see images including the state in which the player character and/or the non-player characters are moved on the field and perceive the images as moving images.

FIG. 3 is an explanatory drawing that shows an example of a table for determining a direct attack reaction to determine a reaction of an attack target character.

As shown in FIG. 3, the direct attack reaction determining table is a table including data in which the type of weapon that the player character uses in the attack, a positional relationship between the player character and the attack target character, the kind of ground level in a battle field where a battle is executed, an attack target weight indicating weight of the attack target character, a PC reaction indicating a reaction of the player character, and a direct attack reaction indicating a reaction of the attack target character correspond to each other.

In the present embodiment, as shown in FIG. 3, with respect to the types of weapon with which the player character can be equipped, a "sword", a "flail", a "hammer", a "might", and a "bow" are provided. A range where a direct attack can be executed against an enemy character is defined with respect to each of the types of weapons.

Further, with respect to the positional relationship, "adjacent to face", "predetermined range of front", "predetermined range of face", and "adjacent to circumference" are provided. The "adjacent to face" means a position adjacent to the face of the player character. The "predetermined range of front" means a predetermined range of the front of the player character having a predetermined width in the horizontal direction of the image display screen 51. The "predetermined range of face" means a predetermined range of the face of the player character. The "adjacent to circumference" means a position adjacent to the circumference of the player character.

Moreover, with respect to the ground level, a "floor", a "grass" and an "ice" are provided. On the "floor" or the "grass", the player character and other characters, including enemy characters, are relatively hardly slipped. Since the "ice" is relatively slippery, the player character and other characters are relatively easily slipped. With respect to the PC reaction, "slip (move) backward" is set to a part of the PC reaction.

Furthermore, "blow off", "flick off", "slip", "jump", "knock back", or "skewer" or a combination of any of these direct attack reactions are set to each of the direct attack reactions. In addition, the length of a distance to be moved in the reaction (for example, long or short), the height to be jumped in the reaction (for example, high or low) and the like may be included in the direct attack reaction.

In this regard, the items in the table for determining a direct attack reaction shown in FIG. 3 are provided just as examples. Other items such as the type of player character and a weight value of the player character may be included in the items.

Next, a direct attack reaction and an indirect attack reaction will now be described in detail.

FIG. 4 is an explanatory drawing that shows a reaction when an enemy character executing a direct attack reaction hits other enemy character (one example of the indirect attack reaction) and a reaction when the enemy character hits a wall (another example of the indirect attack reaction). FIGS. 5 to 10 are explanatory drawings that show contents of each of direct attack reactions and indirect attack reactions.

A direct attack reaction "blow off" means a reaction in which the enemy character is caused to fly high in a predetermined distance. Namely, for example, as shown in the side view of FIG. 5A, when the direct attack reaction due to an attack of the player character is determined to the reaction "blow off", an enemy character A that is an attack target character executes a reaction to jump high in a predetermined distance.

Further, when the enemy character executing the reaction "blow off" comes into contact with other enemy character, the direct attack reaction of the enemy character (direct reaction character) is terminated. The other enemy character with which the enemy character comes into contact executes an indirect attack reaction "blown off". Namely, for example, as shown in the side view of FIG. 5B, the enemy character A that is the attack target character comes into contact with other enemy character B that is positioned at a landing region after the enemy character A jumps high in a predetermined distance as the direct attack reaction "blow off". In such a case, the direct attack reaction of the enemy character A is terminated, and the enemy character B further executes the reaction "blow off". In this regard, the contact during the execution of the direct attack reaction results in the indirect attack due to the direct attack. The HP of the enemy character that suffers this indirect attack decreases by a predetermined point (which is the same as below).

Moreover, when the enemy character executing the reaction "blow off" collides with a wall provided in the field, the direct attack reaction is terminated at the collision point. Namely, for example, as shown in the side view of FIG. 5C, when the enemy character A that is the attack target character collides with the wall provided in the field while flying high in a predetermined distance due to the reaction "blow off", the enemy character A is stopped at the collision point. In this regard, the collision during the direct attack reaction results in the indirect attack due to the direct attack. The HP of the enemy character that suffers this indirect attack decreases by a predetermined point (which is the same as below).

A direct attack reaction "flick off" means a reaction in which the enemy character is caused to bounce and fly low at a predetermined number of times. Namely, for example, as shown in the side view of FIG. 6A, when the direct attack reaction due to an attack of the player character is determined to the reaction "flick off", an enemy character A that is an attack target character executes a reaction to bounce and fly low at a predetermined number of times.

Further, when the enemy character executing the reaction "flick off" comes into contact with other enemy character, the direct attack reaction of the enemy character (direct reaction character) is not terminated. The other enemy character with which the enemy character comes into contact executes an indirect attack reaction "flick off". Namely, for example, as shown in the top view of FIG. 6B, the enemy character A that is the attack target character comes into contact with other enemy characters B and C that are positioned at a moving route when the enemy character A bounces and flies low at a predetermined number of times as the-direct attack reaction "flick off". In such a case, the direct attack reaction of the enemy character A is not terminated, and each of the enemy characters B and C further executes the reaction "flick off".

Moreover, when the enemy character executing the reaction "flick off" collides with a wall provided in the field, the attack target character bounces at the collision point and stops after further moving in a predetermined distance. Namely, for example, as shown in the top view of FIG. 6C, when the enemy character A that is the attack target character collides with the wall provided in the field while bouncing and flying low at a predetermined number of times due to the reaction "flick off", the enemy character A bounces at the collision point and stops after further moving in a predetermined distance.

A direct attack reaction "slip" (or slide) means a reaction in which the enemy character is caused to slip in a predetermined distance. Namely, for example, as shown in the side view of FIG. 7A, when the direct attack reaction due to an attack of the player character is determined to the reaction "slip", an enemy character A that is an attack target character executes a reaction to slip in a predetermined distance.

Further, when the enemy character executing the reaction "slip" comes into contact with other enemy character, the direct attack reaction of the enemy character (direct reaction character) is not terminated. The other enemy character with which the enemy character comes into contact executes an indirect attack reaction "slip". Namely, for example, as shown in the top view of FIG. 7B, the enemy character A that is the attack target character comes into contact with other enemy characters B and C that are positioned at a moving route when the enemy character A slips in a predetermined distance as the direct attack reaction "slip". In such a case, the direct attack reaction of the enemy character A is not terminated, and each of the enemy characters B and C further executes the reaction "slip".

Moreover, when the enemy character executing the reaction "slip" collides with a wall provided in the field, the attack target character bounces at the collision point and stops after further moving (slipping) in a predetermined distance. Namely, for example, as shown in the top view of FIG. 7C, when the enemy character A that is the attack target character collides with the wall provided in the field while slipping in a predetermined distance due to the reaction "slip", the enemy character A bounces at the collision point and stops after further moving (slipping) in a predetermined distance.

A direct attack reaction "jump" means a reaction in which the enemy character is caused to jump to a predetermined height and then drop. Namely, for example, as shown in the side view of FIG. 8, when the direct attack reaction due to an attack of the player character is determined to the reaction "jump", an enemy character A that is an attack target character executes a reaction to jump to a predetermined height and then drop.

Figure 8:
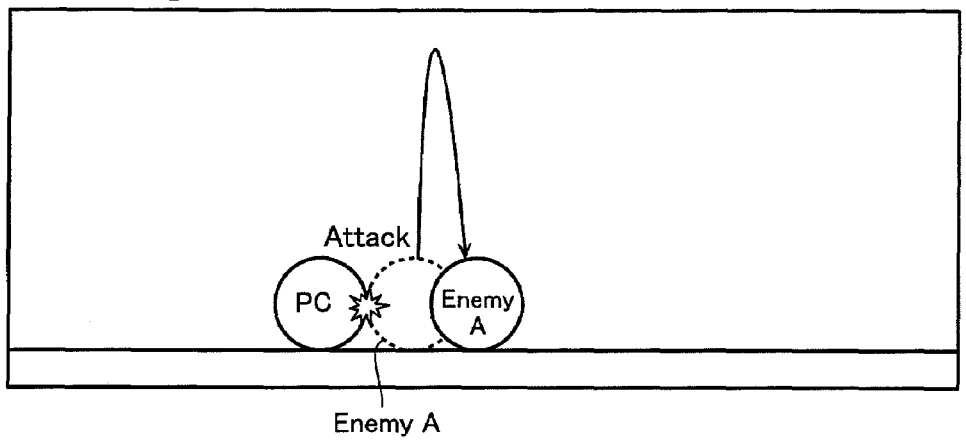
FIG. 8 is an explanatory drawing that shows contents of a direct attack reaction "jump".
Figure 9A:
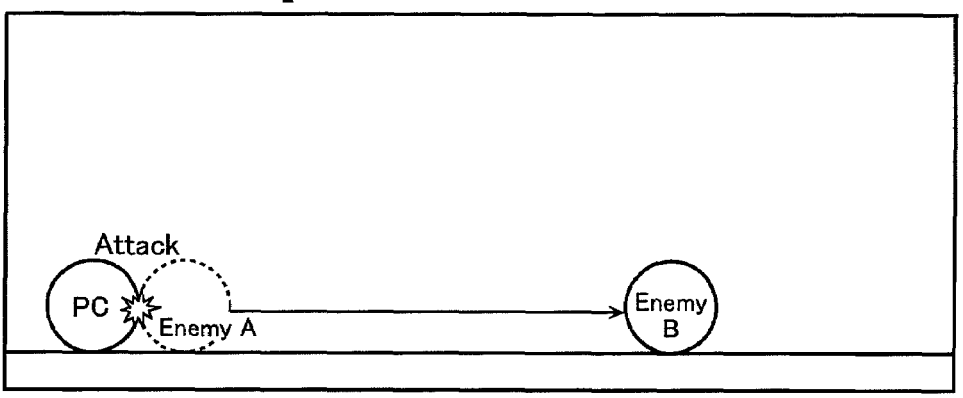
FIG. 9 is an explanatory drawing that shows contents of a direct attack reaction "knock back".
Figure 9B:
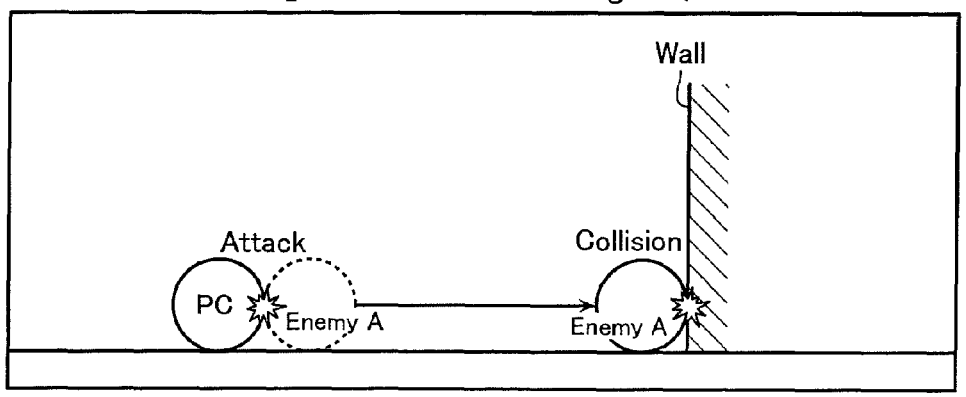

In this regard, although the position at which the enemy character A suffers the attack is off from the position at which the enemy character A drops for the sake of convenience of the explanation of FIG. 8, the enemy character A should drop at the same position as that when the enemy character A suffers the attack in the present embodiment. For that reason, the enemy character executing the reaction "jump" neither come into contact with other enemy character nor collide with a wall provided in the field.

A direct attack reaction "knock back" means a reaction in which the enemy character is caused to slip in a predetermined distance. Namely, for example, as shown in the side view of FIG. 9A, when the direct attack reaction due to an attack of the player character is determined to the reaction "knock back", an enemy character A that is an attack target character executes a reaction to slip in a predetermined distance. In this regard, the enemy character executing the reaction "knock back" should not come into contact with other enemy character in the present embodiment.

Further, when the enemy character executing the reaction "knock back" collides with a wall provided in the field, the direct reaction of the enemy character is terminated at the collision point. Namely, for example, as shown in the side view of FIG. 9B, when the enemy character A that is the attack target character collides with the wall provided in the field while slipping in a predetermined distance due to the reaction "knock back", the enemy character A stops at the collision point.

A direct attack reaction "skewer" means a reaction in which the enemy character is caused to slip until the enemy character hits a wall provided in the field. Namely, for example, as shown in the side view of FIG. 10A, when the direct attack reaction due to an attack of the player character is determined to the reaction "skewer", an enemy character A that is an attack target character executes a reaction to slip until the enemy character A hits a wall provided in the field.

Further, when the enemy character executing the reaction "skewer" comes into contact with other enemy character, the direct attack reaction of the enemy character (direct reaction character) is not terminated. The enemy character executes a reaction to slip until the enemy character hits a wall provided in the field together with other enemy character(s) with which the enemy character comes into contact. Namely, for example, as shown in the top view of FIG. 10B, the enemy character A that is the attack target character in turn comes into contact with other enemy characters B and C that are positioned at a moving route when the enemy character A slips in the field as the direct attack reaction "skewer". In such a case, the direct attack reaction of the enemy character A is not terminated, and the enemy character A slips in a skewered form together with the contacted enemy characters B and C until the skewered enemy characters A, B and C hit the wall. On the other hand, in the case where the enemy characters A, B and C further come into contact with other enemy characters D and E while slipping in the skewered form, the enemy characters A, B and C continue the reaction in the skewered form, and each of the contacted enemy characters D and E executes the reaction "skewer" individually.

Figure 10A:
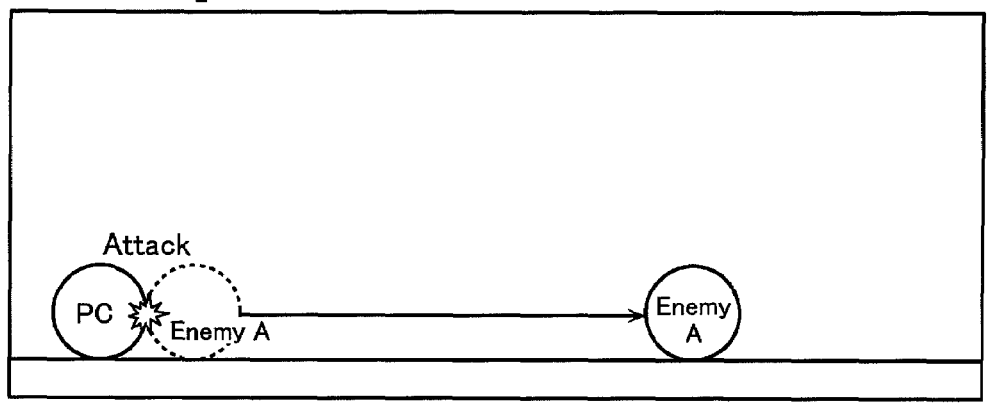
FIG. 10 is an explanatory drawing that shows contents of a direct attack reaction "skewer".
Figure 10B:
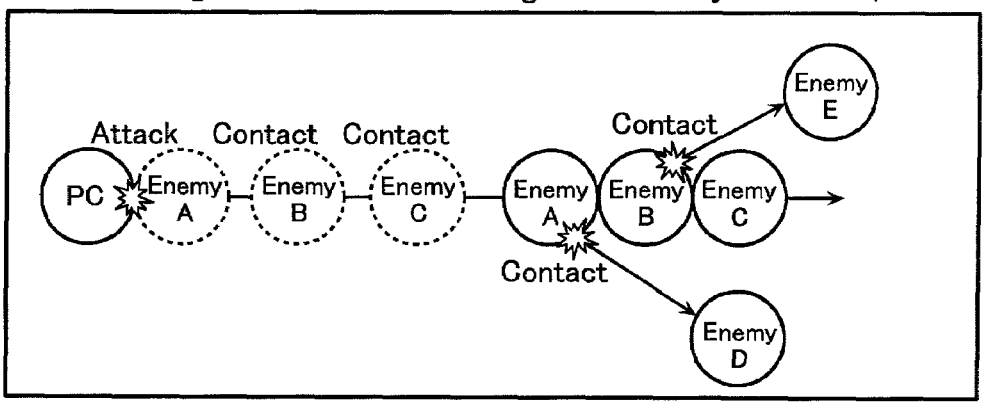
Figure 10C:
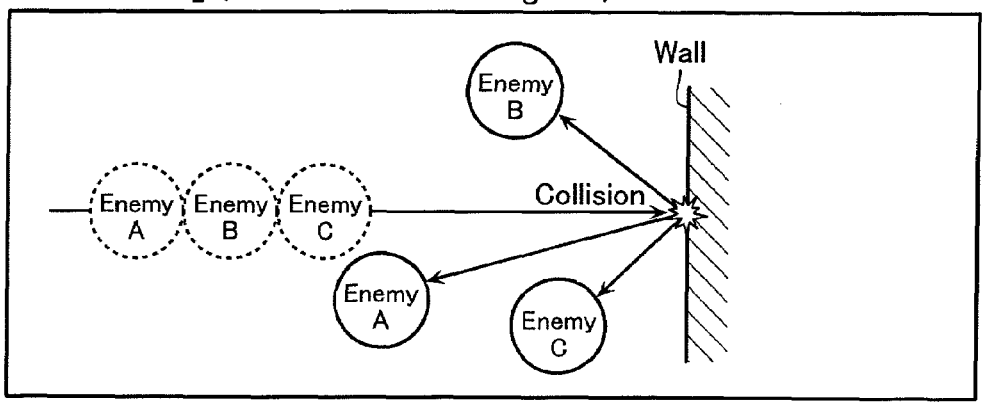

Moreover, when the enemy character executing the reaction "skewer" collides with a wall provided in the field, the attack target character bounces at the collision point and stops after further moving (slipping) in a predetermined distance. Namely, for example, as shown in the top view of FIG. 10C, when the enemy character A that is the attack target character collides with the wall provided in the field while slipping in the field due to the reaction "skewer", the enemy character A bounces at the collision point and stops after further moving (slipping) in a predetermined distance. In this regard, in the case where the enemy characters A, B and C collide with the wall in the skewered form, as shown in FIG. 10C, the enemy characters A, B and C bounce back separately.

Next, a reaction control process of the video game apparatus 100 according to the present embodiment will now be described.

Figure 11:
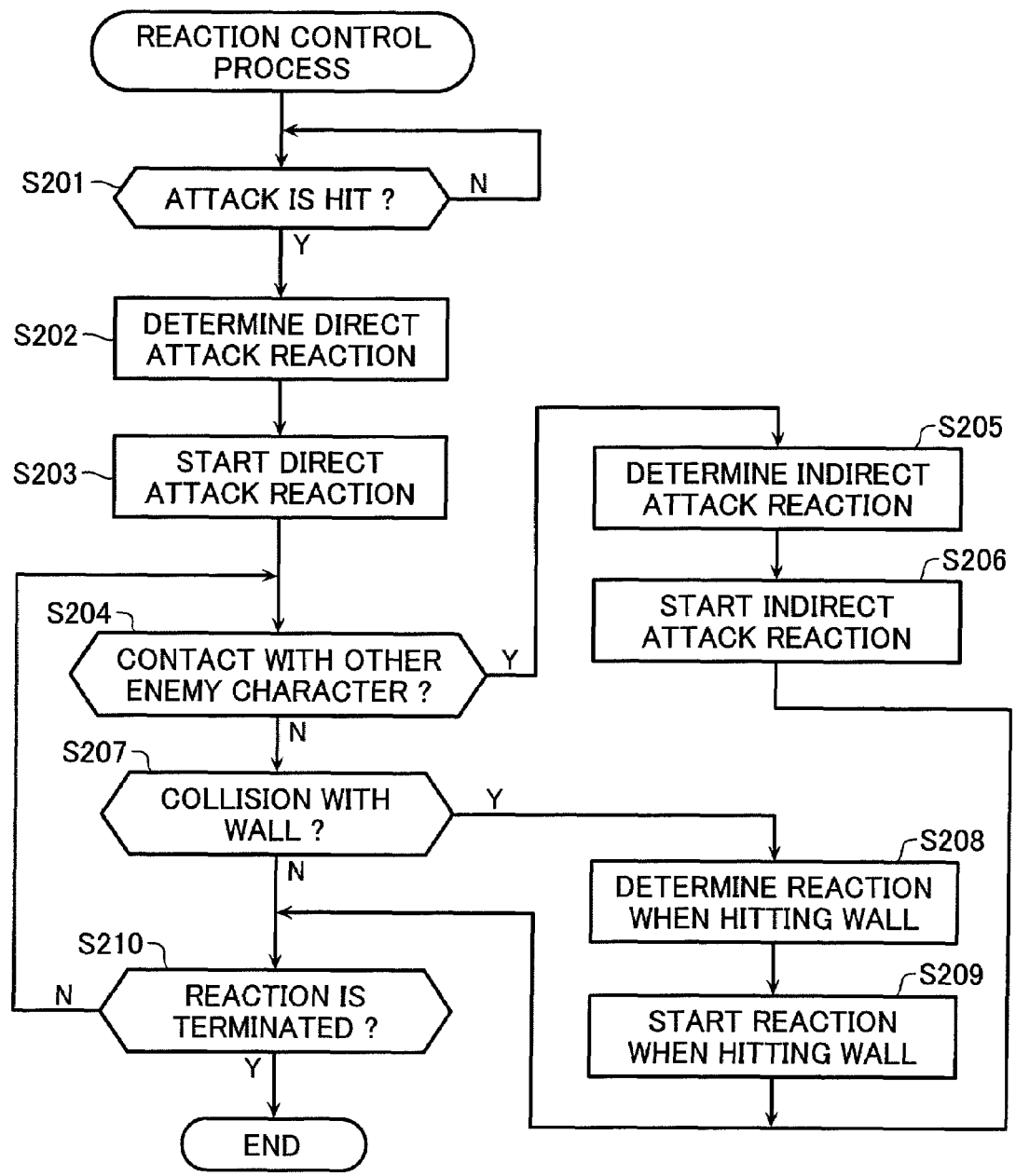
FIG. 11 is a flowchart that illustrates an example of a reaction control process.

FIG. 11 is a flowchart that illustrates an example of a reaction control process in the video game apparatus 100 of the present embodiment. The reaction control process is a process in which processes relating to reactions against an action (attack) of the player character are put into one flowchart. This reaction control process is executed by executing the main process described above repeatedly.

Here, the case where the player character P attacks an enemy character or enemy characters and then the enemy character (for example, enemy character A) that suffers the attack from the player character P executes an reaction will be described as one example.

In the reaction control process, the control section 11 first determines whether or not an attack from the player character P hits an enemy character (Step S201). More specifically, when an attack is instructed on the basis of an operation of the keypad 30 by the player, the control section 11 determines whether or not the attack hits any of the enemy characters positioned in the field in accordance with a weapon with which the player character P is equipped and a positional relationship between the player character P and the enemy character positioned in the field. Namely, the control section 11 determines whether or not the attack hits the enemy character by determining whether or not the enemy character is positioned within an attack effective area defined in advance in accordance with a weapon (see the "positional relationship" for every weapon shown in FIG. 3).

In the case where it is determined that the attack hits an enemy character A, the control section 11 determines the content of a reaction (direct attack reaction) of the enemy character A when the attack from the player character P hits the enemy character A (Step S202). At Step S202, the control section 11 determines the direct attack reaction in accordance with the setting contents of the table for determining a direct attack reaction (see FIG. 3). More specifically, the control section 11 determines the direct attack reaction on the basis of the weapon with which the player character P is equipped, the positional relationship between the player character P and the enemy character A, the type of ground level, the weight value set to the enemy character A that is an attack target, and the like.

For example, assume the case where: the weapon with which the player character P is equipped is a "sword"; the enemy character A is positioned adjacent to the face of the player character P; the type of ground level is a "floor" or a "grass"; and the weight value set to the enemy character A that is an attack target is less than 50. In this case, as shown in FIG. 3, the control section 11 determines a reaction "blow off by a relatively short predetermined distance" as the direct attack reaction.

In this regard, at Step S202, the control section 11 may determine a moving direction of the enemy character A for the direct attack reaction, and/or, if needed, a moving direction of the player character P (for example, the case where the player character P is also moved, see the "PC reaction" of FIG. 3).

When the direct attack reaction is determined, the control section 11 starts to execute the determined direct attack reaction for the enemy character A (Step S203). For example, in the case where the reaction "blow off by a relatively short predetermined distance" is determined as the direct attack reaction, the control section 11 starts to cause the display device 50 to display an image in which the enemy character A is being blown off.

Subsequently, the control section 11 determines whether or not the enemy character A executing the direct attack reaction comes into contact with other enemy character (Step S204). In the case where it is determined that the enemy character A comes into contact with the other enemy character, the control section 11 determines a reaction of the enemy character A due to the contact (indirect attack reaction), and determines a reaction of the contacted other character due to the contact (indirect attack reaction) (Step S205).

At Step S205, for example, the control section 11 determines the indirect attack reactions to be executed using the combination of contact related information and a table for determining an indirect and direct attack reaction (not shown in the drawings). The contact related information includes the kind of direct attack reaction during execution, an execution state of the direct attack reaction (for example, how long does a distance to be slipped remain?), the weight value of the enemy character that executes the direct attack reaction, and the weight value of the contacted other enemy character, for example. Further, respective indirect attack reactions correspond to the contact related information in the table for determining an indirect and direct attack reaction. More specifically, for example, in the case where the direct attack reaction that the enemy character A is executing is "blow off" and the enemy character A comes into contact with an enemy character B, the control section 11 determines that the indirect attack reaction of the enemy character A is "stop" and the indirect attack reaction of the enemy character B is "blow off".

In this regard, at Step S205, the control section 11 determines a moving direction of each of the enemy characters A and B due to the indirect attack reaction.

When the indirect attack reactions are determined, the control section 11 starts to execute the determined indirect attack reactions for the enemy characters A and B (Step S206). For example, in the case where it is determined that the indirect attack reaction of the enemy character A is "stop" and the indirect attack reaction of the enemy character B is "blow off", the control section 11 starts to cause the display device 50 to display an image in which the enemy character A is stopped due to the contact and the enemy character B is blown off due to the contact (see FIG. 5B).

Subsequently, the control section 11 determines whether or not the enemy character A executing the direct attack reaction collides with an obstacle such as a wall provided in the field (Step S207). In the case where it is determined that the enemy character A collides with the obstacle, the control section 11 determines a reaction of the enemy character A due to the collision (reaction at collision) (Step S208). In this case, the "reaction at collision" is one example of the indirect attack reaction.

At Step S208, for example, the control section 11 determines the reaction at collision to be executed using the combination of collision related information and a table for determining a reaction at collision (not shown in the drawings). The collision related information includes the kind of direct attack reaction during execution, an execution state of the direct attack reaction (for example, how long does a distance to be slipped remain?), and the weight value of the enemy character that executes the direct attack reaction, for example. Further, respective reactions at collision correspond to the collision related information in the table for determining a reaction at collision. More specifically, for example, in the case where the direct attack reaction that the enemy character A is executing is "blow off" and the enemy character A collides with the wall, the control section 11 determines that the reaction at collision of the enemy character A is "stop".

In this regard, at Step S208, the control section 11 determines a moving direction of each of the enemy character A due to the reaction at collision.

When the reaction at collision is determined, the control section 11 starts to execute the determined reaction at collision for the enemy character A (Step S209). For example, in the case where it is determined that the reaction at collision of the enemy character A is "stop", the control section 11 starts to cause the display device 50 to display an image in which the enemy character A is stopped due to the collision (see FIG. 5C).

The control section 11 then determines whether or not all of the reactions during the execution (that is, the direct attack reaction, and the indirect attack reaction and/or the reaction at collision) are terminated (Step S210). In the case where it is determined that there is any reaction whose execution is not terminated yet, the processing flow returns to Step S204. On the other hand, in the case where it is determined that all of the reactions during the execution are terminated, this reaction control process is also terminated.

The direct attack reaction due to the direct attack from the player character P and the indirect attack reaction(s) due to the indirect attack from the player character P are executed in the manner as described above. In this regard, a predetermined point is subtracted from the HP of each of the enemy characters that suffer the direct attack or the indirect attack when each of the reactions is started.

As explained above, in the embodiment described above, the video game apparatus 100 is constructed as follows. Namely, it is determined whether the attack from the player character P hits the enemy character A that is an attack target character or not when the specification of the attack for the player character P is received on the basis of an attack specifying operation of the player (see Step S201). A direct attack reaction indicating a reaction of the enemy character A that suffers the direct attack is determined in the case where it is determined that the attack hits the attack target character, that is, the enemy character A (see Step S202). The enemy character A is then caused to execute the determined direct attack reaction (Step S203). It is determined whether or not an indirect attack caused by contact between the enemy character A executing the direct attack reaction and other attack target character hits an enemy character B other than the enemy character A (see Step S204). In the case where it is determined that the indirect attack hits the enemy character B, the indirect attack reaction indicating a reaction of the enemy character B that suffers the indirect attack and the indirect attack reaction indicating a reaction of the enemy character A that comes into contact with the enemy character B are determined (see Step S205). The enemy characters A and B are then caused to execute the determined indirect attack reactions, respectively. Thus, the indirect attack due to the direct attack can be executed against the enemy character regardless of limiting a predetermined range. Therefore, it is possible to increase variations in an attack during a battle in the video game, and this makes it possible to improve player's interest in the video game.

Namely, damage can be applied not only to an enemy character positioned within a predetermined range but also to an enemy character positioned outside the predetermined range by devising an attack method. Thus, it is possible to improve player's interest in the video game without monotonizing the attack.

For example, by predicting the reaction of an enemy character that suffers a direct attack, it is possible to apply damage to the enemy character further and to apply damage to other enemy character in a chain reaction. Since it is possible to adopt various devices in the method of the direct attack in this way, the present invention can be expected to maintain and improve interest of a skilled player in the video game, in particular.

Further, in the embodiment described above, the video game apparatus 100 is constructed so that the direct attack reaction is determined on the basis of the table for determining a direct attack reaction (see FIG. 3) in which information for determining the direct attack reaction, including the weapon that the player character uses for the attack, is set. Thus, it is possible to change a direct attack reaction in accordance with a weapon used for an attack by the player character. This makes it possible to increase variations in an attack. In this regard, a change in the direct attack reaction of the present invention is not limited to the kind of weapon. For example, the direct attack reaction may be changed in accordance with other attack contents such as the kind of attack magic.

Moreover, in the embodiment described above, the video game apparatus 100 is constructed so that the direct attack reaction is determined on the basis of the table for determining a direct attack reaction (see FIG. 3) in which information for determining a direct attack reaction, including the type of ground level in a battle field where a battle is executed, is set. Thus, it is possible to change a direct attack reaction in accordance with the type of ground level. This makes it possible to increase variations in an attack.

Furthermore, in the embodiment described above, the video game apparatus 100 is constructed so that the direct attack reaction is determined on the basis of the table for determining a direct attack reaction (see FIG. 3) in which information for determining a direct attack reaction, including the weight value preset as weight of a direct attack target character, is set. Thus, it is possible to change a direct attack reaction in accordance with the weight value of the direct attack target character. This makes it possible to increase variations in an attack.

Further, in the embodiment described above, the video game apparatus 100 is constructed so as to select one direct attack target character against which an attack is be executed using the table for determining a direct attack reaction (see FIG. 3) in which multiple kinds of direct attack reactions are set. Thus, it is possible to determine the direct attack reaction quickly and easily.

Moreover, in the embodiment described above, the video game apparatus 100 is constructed so as to determine an indirect attack reaction in accordance with the kind of the direct attack reaction of the direct attack target character that comes into contact with an indirect attack target character. Thus, it is possible to determine the indirect attack reaction that is changed in accordance with the kind of the direct attack reaction of the direct attack target character. This makes it possible to increase variations in an attack.

In this regard, although the attack target character has been described using the enemy character as one example in the embodiment described above, a target of a direct attack or an indirect attack may be other character (other attack target character) such as an item that can be obtained or taken out as a result of destruction or the like, for example.

Furthermore, although the video game apparatus main body 10 and the display device 50 are constructed from separate components in the embodiment described above, the display device 50 may be incorporated in the video game apparatus main body 10, as will be readily apparent to those skilled in the art, without departing from the scope of spirit of the present invention.

Further, although one example of the video game control for the RPG has been explained in the embodiment described above, there is no wonder that the technique of the present invention can be applied to similar video games such as a gun action RPG. In addition, the technique of the present invention can also be applied to other kinds of video games appropriately, as will be readily apparent to those skilled in the art, without departing from the scope of spirit of the present invention.

Further, although an aspect of the present invention has been described with the video game apparatus 100 as an example in the embodiment described above, the present invention is not limited thereto. The present invention can be applied to various apparatuses such as a personal computer, a cellular phone terminal, a portable game apparatus and the like as long as such an apparatus has an image generating function. In this regard, in the case where the present invention is applied to a portable game apparatus or the like, a small-sized storage medium such as a semiconductor memory card may be used as the storage medium 70 described above in place of a CD-ROM or DVD-ROM, or any other type of storage medium as those skilled in the art will appreciate without departing from the scope or spirit of the present invention.

Moreover, in the embodiment described above, it has been described that game data for causing the video game apparatus main body 10 (video game apparatus 100) to execute the various processes described above (that is, various data such as control program data used for the video game) are stored in the storage medium 70. However, the present invention is not limited thereto. The video game data may be delivered by a server apparatus such as a network server (WWW server), or other computer device connected (either wired or wireless) to a network, such as the Internet, a local area network, a wide area network, or the like, or any combination thereof. In this case, the video game apparatus main body 10 may obtain the video game data delivered by the server apparatus via the communication network 80, and store the video game data in the HDD 13. The video game data may be used by being loaded on the RAM 12 from the HDD 13. In this regard, although the video game data are explained in the embodiment described above, such data may include at least control program data for causing a computer to execute the image generating process in the embodiment as described above.

The present invention can be applied to a video game machine, a personal computer, a cellular phone terminal, a portable game apparatus or the like, or any combination thereof that causes an image display apparatus to display a player character on an image display screen, and controls progress of a video game by controlling an action of the player character displayed on the image display screen in response to an operation by a player. Therefore, the present invention is useful.

What is claimed is:

1. A video game processing apparatus that causes an image display apparatus to display a player character on an image display screen of the image display apparatus, the video game processing apparatus controlling progress of the video game by controlling an action of the player character to be displayed on the image display screen in accordance with operations by a player, the video game processing apparatus comprising:

an attack specifying receiver that receives specification of an attack for the player character by an attack specifying operation of the player;

a direct attack hit determiner that determines whether the attack from the player character hits a direct attack target enemy character movable on a field in the video game, when the attack specifying receiver receives the attack specification;

a direct attack reaction determiner that determines a direct attack reaction in accordance with direct reaction determination information including attack content of the player character, a kind of ground level in a battle field where a battle is executed, and a weight preliminarily set as a weight of the direct attack target enemy character, when the direct attack hit determiner determines that the attack hits the direct attack target enemy character, the direct attack reaction indicating a reaction of the direct attack target enemy character that suffers the direct attack;

a direct attack reaction executor that causes the direct attack target enemy character to execute the direct attack reaction determined by the direct attack reaction determiner;

an indirect attack hit determiner that determines whether an indirect attack hits an indirect attack target enemy character other than the direct attack target enemy character when the direct attack target enemy character executes the direct attack reaction by the direct attack reaction executer, the indirect attack being caused by contact between the direct attack target enemy character and the indirect attack target enemy character movable on the field;

an indirect attack reaction determiner that determines an indirect attack reaction when the indirect attack hit determiner determines that the indirect attack hits the indirect attack target enemy character, the indirect attack reaction indicating a reaction of the indirect attack target enemy character that suffers the indirect attack; and an indirect attack reaction executor that causes the indirect attack target enemy character to execute the indirect attack reaction determined by the indirect attack reaction determiner, wherein the direct attack target enemy character is a non-player character.

2. The video game processing apparatus according to claim 1, wherein the direct attack reaction determiner determines the direct attack reaction by selecting one direct attack reaction from multiple kinds of direct attack reactions including a first reaction, a second reaction, a third reaction and a fourth reaction, the direct attack target enemy character being blown off in the first reaction, the direct attack target enemy character being flicked off in the second reaction, the direct attack target enemy character being slipped in the third reaction, and the direct attack target enemy character being jumped in the fourth reaction.

3. The video game processing apparatus according to claim 1, wherein the indirect attack reaction determiner determines the indirect attack reaction in accordance with the kind of direct attack reaction of the direct attack target enemy character that is brought into contact with the indirect attack target enemy character.

4. A computer-implemented method of processing a video game by causing an image display apparatus to display a player character on an image display screen of the image display apparatus, the method controlling progress of the video game by controlling an action of the player character to be displayed on the image display screen in accordance with operations by a player, the computer-implemented method comprising:

receiving, using a computer, specification of an attack for the player character by an attack specifying operation of the player;

determining, using the computer, whether the attack from the player character hits a direct attack target enemy character movable on a field in the video game, when the attack specification is received;

determining, using the computer, a direct attack reaction in accordance with direct reaction determination information including attack content of the player character, a kind of ground level in a battle field where a battle is executed, and a weight preliminarily set as a weight of the direct attack target enemy character, when it is determined that the attack hits the direct attack target enemy character, the direct attack reaction indicating a reaction of the direct attack target enemy character that suffers the direct attack;

causing, using the computer, the direct attack target enemy character to execute the determined direct attack reaction;

determining, using the computer, whether an indirect attack hits an indirect attack target enemy character other than the direct attack target enemy character when the direct attack target enemy character executes the direct attack reaction, the indirect attack being caused by contact between the direct attack target enemy character and the indirect attack target enemy character movable on the field;

determining, using the computer, an indirect attack reaction when it is determined that the indirect attack hits the indirect attack target enemy character, the indirect attack reaction indicating a reaction of the indirect attack target enemy character that suffers the indirect attack; and causing, using the computer, the indirect attack target enemy character to execute the determined indirect attack reaction, wherein the direct attack target enemy character is a non-player character.

5. The method according to claim 4, wherein in the direct attack reaction determining, the direct attack reaction is determined by selecting one direct attack reaction from multiple kinds of direct attack reactions including a first reaction, a second reaction, a third reaction and a fourth reaction, the direct attack target enemy character being blown off in the first reaction, the direct attack target enemy character being flicked off in the second reaction, the direct attack target enemy character being slipped in the third reaction, and the direct attack target enemy character being jumped in the fourth reaction.

6. The method according to claim 4, wherein in the indirect attack reaction determining, the indirect attack reaction is determined in accordance with the kind of direct attack reaction of the direct attack target enemy character that is brought into contact with the indirect attack target enemy character.

7. A computer readable medium that stores a program for processing a video game, progress of the video game being controlled by causing an image display apparatus to display a player character of the video game on an image screen of the image display apparatus, and controlling an action of the player character displayed on the image screen in accordance with operations by a player, the program on the computer readable medium causing a computer to execute:

receiving specification of an attack for the player character by an attack specifying operation of the player;

determining whether the attack from the player character hits a direct attack target enemy character movable on a field in the video game, when the attack specification is received;

determining a direct attack reaction in accordance with direct reaction determination information including attack content of the player character, a kind of ground level in a battle field where a battle is executed, and a weight preliminarily set as a weight of the direct attack target enemy character, when it is determined that the attack hits the direct attack target enemy character, the direct attack reaction indicating a reaction of the direct attack target enemy character that suffers the direct attack;

causing the direct attack target enemy character to execute the determined direct attack reaction;

determining whether an indirect attack hits an indirect attack target enemy character other than the direct attack target enemy character when the direct attack target enemy character executes the direct attack reaction, the indirect attack being caused by contact between the direct attack target enemy character and the indirect attack target enemy character movable on the field;

determining an indirect attack reaction when it is determined that the indirect attack hits the indirect attack target enemy character, the indirect attack reaction indicating a reaction of the indirect attack target enemy character that suffers the indirect attack; and causing the indirect attack target enemy character to execute the determined indirect attack reaction, wherein the direct attack target enemy character is a non-player character.

8. The computer readable medium according to claim 7, wherein in the direct attack reaction determining, the direct attack reaction is determined by selecting one direct attack reaction from multiple kinds of direct attack reactions including a first reaction, a second reaction, a third reaction and a fourth reaction, the direct attack target enemy character being blown off in the first reaction, the direct attack target enemy character being flicked off in the second reaction, the direct attack target enemy character being slipped in the third reaction, and the direct attack target enemy character being jumped in the fourth reaction.

9. The computer readable medium according to claim 7, wherein in the indirect attack reaction determining, the indirect attack reaction is determined in accordance with the kind of direct attack reaction of the direct attack target enemy character that is brought into contact with the indirect attack target enemy character.

* * * * *